(12) United States Patent
Page (10) Patent No.: US 7,830,443 B2
(45) Date of Patent: Nov. 9, 2010

(54) DUAL MODE IMAGE ENGINE

(75) Inventor: Harry Page, Almonte (CA)

(73) Assignee: Psion Teklogix Systems Inc., Mississauga (CA)

( * ) Notice: Subject to any disclaimer, the term of this patent is extended or adjusted under 35 U.S.C. 154(b) by 930 days.

(21) Appl. No.: 11/018,890

(22) Filed: Dec. 21, 2004

(65) Prior Publication Data

US 2006/0132639 A1  Jun. 22, 2006

(51) Int. Cl.
*H04N 5/225* (2006.01)
*G02B 26/00* (2006.01)
*G03B 13/00* (2006.01)

(52) U.S. Cl. .................. 348/340; 348/360; 235/462.11; 235/462.35

(58) Field of Classification Search .................. 348/340, 348/345–348, 350, 352, 360, 361, 359; 235/462.09, 235/462.11, 462.1, 462.23, 462.24, 462.35, 235/462.42, 462.32
See application file for complete search history.

(56) References Cited

U.S. PATENT DOCUMENTS

| | | | |
|---|---|---|---|
| 4,843,222 A | 6/1989 | Hochgraf | |
| 5,210,398 A | 5/1993 | Metlitsky | |
| 5,308,966 A | 5/1994 | Danielson et al. | |
| 5,521,366 A * | 5/1996 | Wang et al. | 235/454 |
| 5,627,366 A * | 5/1997 | Katz | 250/234 |
| 5,748,371 A | 5/1998 | Cathey, Jr. et al. | |
| 5,756,981 A * | 5/1998 | Roustaei et al. | 235/462.42 |
| 6,053,408 A * | 4/2000 | Stoner | 235/462.22 |
| 6,097,856 A | 8/2000 | Hammond, Jr. | |
| 6,152,371 A | 11/2000 | Schwartz et al. | |
| 6,340,114 B1 | 1/2002 | Correa et al. | |
| 6,547,139 B1 | 4/2003 | Havens et al. | |
| 6,688,525 B1 * | 2/2004 | Nelson et al. | 235/462.21 |
| 6,804,460 B1 * | 10/2004 | Oshima et al. | 396/74 |
| 6,819,360 B1 * | 11/2004 | Ide et al. | 348/340 |
| 6,856,695 B1 * | 2/2005 | Nakamura et al. | 382/124 |
| 6,924,948 B2 * | 8/2005 | Oshima et al. | 359/754 |
| 6,942,152 B1 * | 9/2005 | Hepworth | 235/462.25 |
| 2004/0004125 A1 | 1/2004 | Havens et al. | |

* cited by examiner

*Primary Examiner*—David L Ometz
*Assistant Examiner*—Carramah J Quiett
(74) *Attorney, Agent, or Firm*—Pearne & Gordon LLP (57) ABSTRACT

An image reader capable of operating in two modes for imaging a target is described. It includes an image sensor, a free-space objective lens system and an optically encoded lens system each adapted to direct light reflected from the target onto the image sensor, and a processor for processing signals from the image sensor. In one mode, the processor processes signals produced by light from the free-space objective lens system and in the other mode, the processor processes signals produced by light from the optically encoded lens system. To achieve this, the two lens systems may direct light to two different areas on the image sensor, or the lens systems may be selectively controlled to direct light from one or other of the systems onto the image sensor.

27 Claims, 6 Drawing Sheets

DUAL MODE IMAGE ENGINE

FIELD OF INVENTION

The present invention relates generally to image readers and more particularly to image readers providing variable focal distances and extended optical depth of field.

BACKGROUND OF THE INVENTION

Digital imaging technology continues to improve and find widespread acceptance in both consumer and industrial applications. Digital imaging readers are now commonplace in video movie cameras, security cameras, video teleconference cameras, machine vision cameras and, more recently, handheld symbology readers. As each application matures, the need for intelligent image processing techniques grows. To date, the large data volume attendant to transmitting a digital image from one location to another could only be accomplished if the two locations were connected by a wired means. Machine vision and other image processing applications required significant computing power to be effective and correspondingly require too much power to be useful in portable applications. The trend now in both consumer and industrial markets is toward the use of portable wireless imaging that incorporates automatic identification technology.

Historically, the automatic identification industry has relied on laser technology as the means for reading symbology. Laser scanners generate a coherent light beam that is oriented by the operator to traverse the horizontal length of the symbology. The reflected intensity of the laser beam is used to extract the width information from the bars and spaces that are encountered. Laser scanners are effective in reading linear symbology such as the U.P.C. code found in retail point-of-sale applications, Code 39, Interleaved 2 of 5, or the like. Information stored in these linear (1D) symbologies is used to represent a short message or an index number related to a separate data file located in a central computer.

Imaging-based scanners use a solid-state image sensor such as a Charge Coupled Device (CCD) or a Complimentary Metal Oxide Semiconductor (CMOS) imager to convert an image scene into a collection of electronic signals. The image signals are processed so that any machine-readable character or symbology found in the field of view can be located in the electronic representation of the image and subsequently interpreted. The ability of image-based readers to capture an electronic image of a two-dimensional area for later processing makes them well suited for decoding all forms of machine-readable symbology at any orientation.

An image-based scanner is made up of an optical imaging chip, light-emitting diodes (LEDs), a lens or lenses, a targeting means and other optical components such as wedges or diffusers. The lens is often attached to the module housing by a threaded assembly which, when tightened and locked, holds the lens at a specific fixed focal distance from the imaging array plane. An illumination board contains the LEDs and targeting means for aiming the target symbology. The lens projects through an aperture in the illumination board which is also held in place by the module housing.

Generally, as in laser scanners, there are different types of cameras to image different types or sizes of symbologies. They include ultra high definition (UHD), high definition (HD), standard (ST) and ultra long range (ULR). These cameras have a different focal distance for each of these different applications. This means that the lens is at a different distance from the imager in each of these cameras in order to provide the different focal ranges required to adequately resolve and decode the target symbology in the intended application.

The distance between the imaging array and the lens determines the focal range of the camera module. Generally, this distance is calibrated and then fixed within the module assembly. To have an auto-focusing system, similar to those found in regular cameras would greatly impact the size, cost and power consumption, making it an impractical feature for camera modules of the type found in image readers. Therefore, it is necessary to configure a separate camera module to accommodate the focal range of different symbology feature sizes.

There are a number of prior art technique which try to overcome the problem of imaging at different focal lengths. A traditional technique includes the implementation of 2 free space optical elements, whereby each element has a different fixed focal lengths. Another technique includes the use of a single objective lens that is moved between different fixed focal points such as those used in automatic focus cameras. While these techniques do offer some advantages over typical single free space objective lens systems, they still provide limited optical depth of field.

U.S. Pat. No. 5,765,981, which issued to Roustaei et al on May 26, 1998, describes a technique used in a camera module having a lens assembly, which contains multiple lenses. The lenses are moved apart in relation to each other by a solenoid or motor. This allows the camera to image the symbology at different focal ranges. This technique however, still provides a limited optical depth of field. Further, the use of a motor or solenoid makes this option expensive and impractical for applications requiring inexpensive components. It is also expected that this would result in a significant latency in the decoding operation as the image is analyzed and the lenses are moved to the desired position. This latency would result in a loss of reading performance to the end user. Additionally, the use of the mechanism to driver the lens assembly can also be prone to performance issues related to the sensitivity of this type of mechanism to mechanical shock or vibration.

U.S. Pat. No. 6,340,114, which issued to Correa et al on Jan. 22, 2002, describes a technique in which the lens assembly comprises two lenses each having a different focal range. A moving optical element such as a mirror is provided to select an image through either the first or second lens. This technique still provides limited depths of field. This technique is also quite complex and requires numerous extra features including dedicated mirrors, and mechanical means such as an electronic servomechanism to control the mirrors. These extra features would make this technique expensive and impractical for a variety of imaging applications such as image readers and barcode readers. The addition of mirrors with servomechanisms also introduces the potential for a loss of mechanical robustness. This type of mechanism is typically used in laser scanners and often the cause of either a loss of performance or functionality due to damage from mechanical shock or vibration.

U.S. Pat. No. 5,748,371, which issued to Cathey Jr. et al on May 5, 1998, describes an apparatus that uses optical encoding and image processing to provide an extended optical depth of field. This is known as a Wavefront Coded™ lens system. The light traveling through a Wavefront Coded™ lens system does not focus on a specific focal plane due to a special surface or mask that is placed in the lens system. No points of the object are imaged as points on the focal plane. Instead, the points are uniformly blurred over an extended range about the focal plane. This special surface can be thought as "encoding" the light passing through the lens system. None of the light passing through this system converges at the focal plane as it would in a traditional free-space objective lens system. Since the image is blurred, signal processing is required to "decode" the blurred image. In traditional optical lens systems, clear images are achieved at the expense of depth of field. In the Wavefront Coded™ lens system, the pre-processed image will contain misfocus aberrations, but will have an extended depth of field. Signal processing and filtering within the Wavefront Coded™ lens system cleans the image while still maintaining the extended depth of field. The primary intended application for this apparatus, however, does not include detecting and decoding symbologies.

U.S. Pat. No. 6,152,371, which issued to Schwartz et al on Nov. 28, 2000, and U.S. Pat. No. 6,547,139, which issued to Havens et al on Apr. 15, 2003, describe a barcode scanner, which uses a cubic phase mask similar to the process described in U.S. Pat. No. 5,748,371 noted above. While this invention modifies the Wavefront Coded™ lens system for the application of detecting and decoding barcode symbols, it does so at the expense of time. Traditional optical elements can image barcode symbologies on average in 100 milliseconds or less. Wavefront Coded™ based lens systems do so at rates of 10 seconds. As well, the current state of barcode decoding algorithms do not require a high level of optical resolution to effectively detect and decode a barcode in an image scene. The improvement this invention provides in optical depth of field does not necessarily result in an increased barcode depth of reading. This approach would increase cost and decode speed, while yielding questionable benefit from a barcode decoding depth of reading.

Therefore there is a need for an imaging system to detect and decode symbologies and other targets in a time efficient manner while at the same time providing an extended depth of field.

SUMMARY OF THE INVENTION

The present invention is directed to an image reader for imaging a target comprising an image sensor, a free-space objective lens system adapted to direct light reflected from the target onto the image sensor, an optically encoded lens system adapted to direct light reflected from the target onto the image sensor and a processor for processing signals from the image sensor.

In accordance with one aspect of the invention, the image sensor comprises first and second areas whereby the light through the free-space objective lens system is directed onto the first area of the image sensor and the light through the optically encoded lens system is directed onto the second area of the image sensor, and the processor is adapted to selectively process the signals from the first area or the second area of the image sensor.

In accordance with a specific aspect of the invention, the reader includes a memory for selectively storing signals from the first area or the second area of the image sensor for processing by the processor.

In accordance with another specific aspect of the invention the image reader comprises an image reader housing for mounting the imager sensor, the free-space objective lens system and the optically encoded lens system, wherein the free-space objective lens system and the optically encoded lens system are mounted in parallel within the image reader housing.

In accordance with a second aspect of the invention, the processor is adapted to control the free-space objective lens system and the optically encoded lens system to selectively direct light to the image sensor from one or other of the lens systems.

In accordance with a specific aspect of the invention, the reader includes a memory for storing signals from the image sensor for processing by the processor.

In accordance with another specific aspect of the invention, the image reader comprises an image reader housing for mounting the imager sensor, the free-space objective lens system, the optically encoded lens system and a control mechanism for controlling the free-space objective lens system and the optically encoded lens system for selectively directing light to the image sensor from one or other of the lens systems.

In accordance with other aspects of the invention, the processor is adapted to transmit the processed signals to a host application through a data bus, through wireless communications and/or to a display for displaying the target image. Further, the free-space objective lens system may comprise a single free-space lens, multiple single free-space lenses, a spherical lens, an aspherical lens and/or a multi-focus lens. Also, the image sensor may be a CMOS or a CCD device.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION

For purposes of explanation, specific embodiments are set forth to provide a thorough understanding of the present invention. However, it will be understood by one skilled in the art, from reading this disclosure, that the invention may be practiced without these specific details. Moreover, well-known elements, devices, process steps and the like are not set forth in detail in order to avoid obscuring the scope of the invention described.

Generally, there are different types of image readers to image different types of targets or symbologies. They include ultra high definition (UHD), high definition (HD), standard and ultra long range (ULR). These image readers have a different focal length for each of these different applications. This means that the objective lens is at a different distance from the image sensor in each of these image readers in order to provide the different focal lengths. The focal length is selected based on the barcode symbology dimensions that must be resolved and the desired image magnification. For example, UHD readers typically attempt to read symbols with very fine features. This requires suitable optical magnification to meet the minimum pixel per feature requirement of the requisite symbol decoder. This often causes deterioration in image capture performance as the unit might be focused too close or too far for most image capture needs. It would be advantageous to have an image reader that could accommodate a wide focal range while maintaining a large field of view (FOV) and good definition quality.

The present invention provides apparatus to acquire a variety of image types with different focal lengths, with a single image reader. The image reader of the present invention comprises a dual mode image engine that utilizes two alternate objective lenses. The objective lenses are selected for their intended application and share a common image sensor, which can be either a CMOS or CCD device.

At least one of the objective lenses is a traditional free-space optical lens commonly used in barcode readers, and can be a single or multi-lens design containing spherical lenses, aspherical lenses or a combination of both. In another embodiment, this lens may be a multi-focus lens able to image a variety of symbology types requiring different depths of field. The lens could also be adjustable through a number of predetermined stops by using a linear actuator to move the lens barrel to any of a number of set positions relative to the imaging plane. To maximize the symbology depth of reading, these free-space optical lenses typically have f-stops in the 5.6-12 range to ensure a usable range acceptable to the consumers of the end user product.

The second objective lens is a lens assembly of the type used in digital imaging system utilizing optical encoding. These lens assemblies have a greatly extended optical depth of field range in comparison to a traditional optical lens system. The optical encoding source may be of the type manufactured by CDM Optics. They describe a Wavefront Coded™ technology in which light traveling through a Wavefront Coded™ lens system does not focus on a specific focal point due to the special encoding lens surface. Full details of the operation of this system are explained in U.S. Pat. No. 5,748,371, which issued to Cathey Jr. et al on May 5, 1998 and which is incorporated herein by reference.

This type of lens system causes the points normally imaged as points on the focal plane, to be blurred over an extended range about the focal plane. This is referred to as "encoding" the light passing through the lens. Essentially, the lens system changes the normal ray path such that each ray is deviated slightly from the path that it would typically take with a traditional unaltered lens system. These deviations mean that the rays do not converge at the focal plane and induce a predetermine point spread function or "blur factor". This modification to the optical system results in the point spread function that is insensitive to a range of misfocus or other optical aberrations. Further, this blurred image detected at the image sensor must be decoded by a subsequent digital filtering operation. The filtering process produces an image, which is clear, but does not have a traditional depth of field. Using this technology, an F/2 system can be used and produce an optical depth of field equivalent to an F/20 system without the inherent light limiting and spatial disadvantages of the slower lens system. This deblurring process is analogous to traditional deblurring techniques such as nearest-neighbor, multi-neighbor and unsharp masking algorithms utilized in a variety of image processing deconvolution applications.

Figure 1:
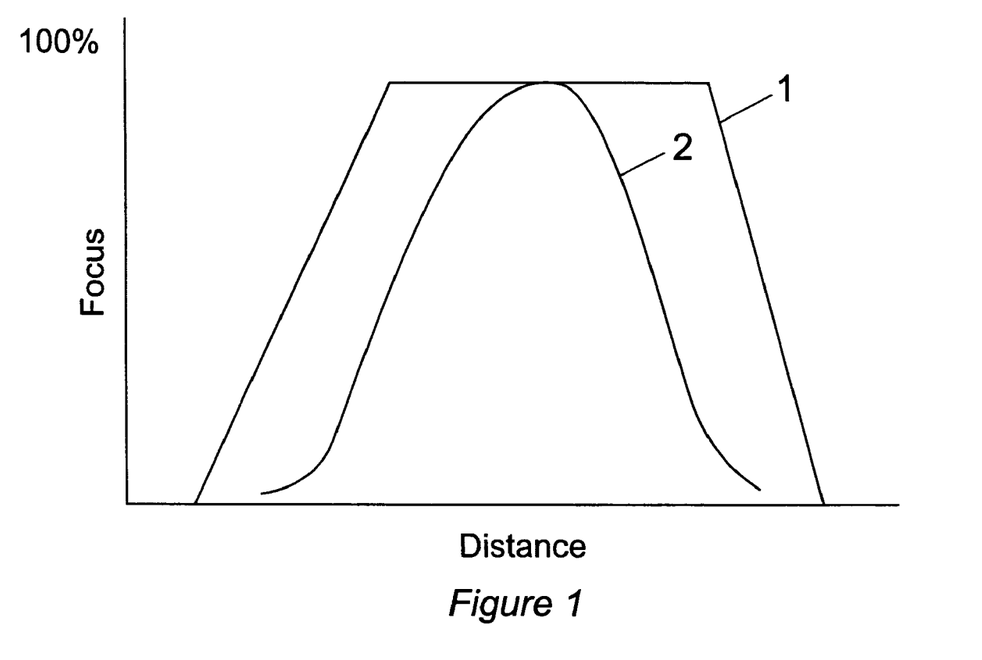
FIG. 1 shows the depth of field curves for both the traditional free-space objective lens and the optical encoded lens system.

In accordance with the present invention, the dual image engine is switched between these two types of objective lenses, depending on the application used. In an imaging system using standard symbology, such as 1D or 2D barcodes, the traditional free space objective lens assembly is used, but in applications requiring high definition image resolution and a greater depth of field, the optical encoding objective lens is used. FIG. 1 shows the depth of field curves for the two lens systems. It is evident from the graph that the depth of field curve for the optical encoding lens system 1 has an extended range over the depth of field curve of the traditional free space objective lens 2. The processing time, however, for decoding the optically encoded image is in the order of 100 times longer than the processing time of a traditional free space objective lens system. Depending on the application, certain factors hold priority over others. For example, in a barcode scanner, processing time is more critical for detecting and decoding 1D or 2D bar code symbols than having an extended depth of field. Alternatively, in an image capture scenario, a reduction in noise, thus an increase in depth of field is an important factor even at the expense of increased processing time.

Figure 2:
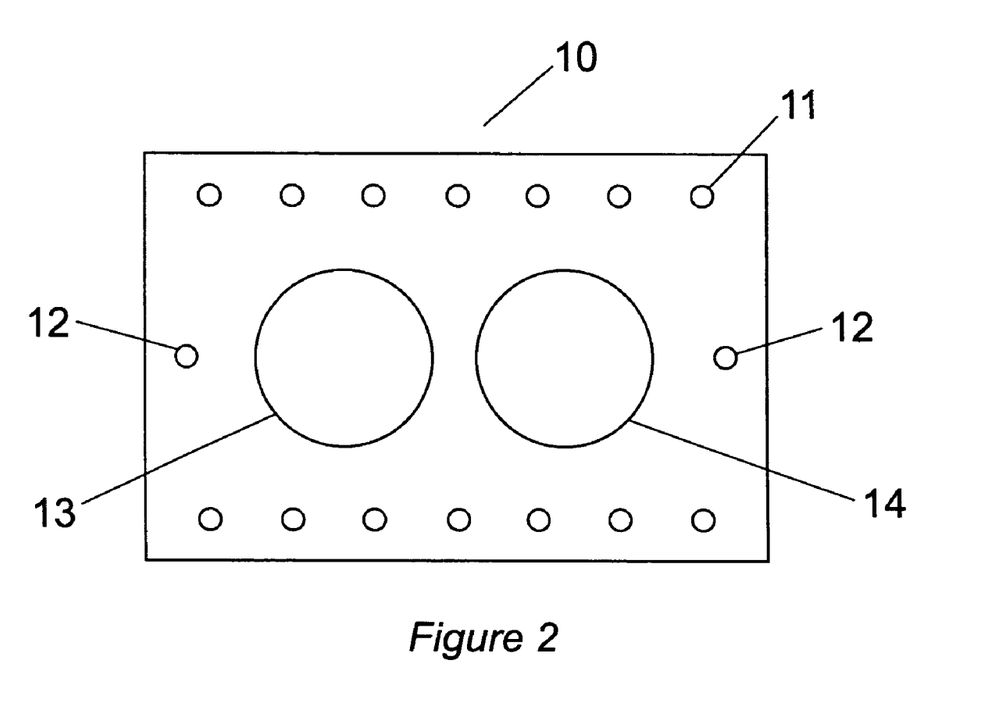
FIG. 2 shows the front view of a barcode reader employing the dual mode image engine of the present invention.

FIG. 2 shows a front view of a dual mode image engine of the present invention. An imaging system 10 such as a barcode scanner comprises, a first illumination source 11, a second illumination source 12, a free-space optical lens 13 and optical encoding lens system 14. The first illumination source 11 can be light-emitting diodes (LEDs) or any other suitable light source. The second illumination source 12 can be lasers, LEDs or any other suitable illumination source. The second illumination source can provide extra illumination in addition to first illumination source 11, or, can be used for either targeting or range-finding. The free-space optical lens 13 is a traditional free-space optical lens. It can be a single lens or a multi-lens design, or alternately it may be a multi-focus lens. The free-space optical lens 13 and the optical encoding lens system 14 are placed side-by-side such that either of these lens systems may be used depending on the application required.

Figure 3:
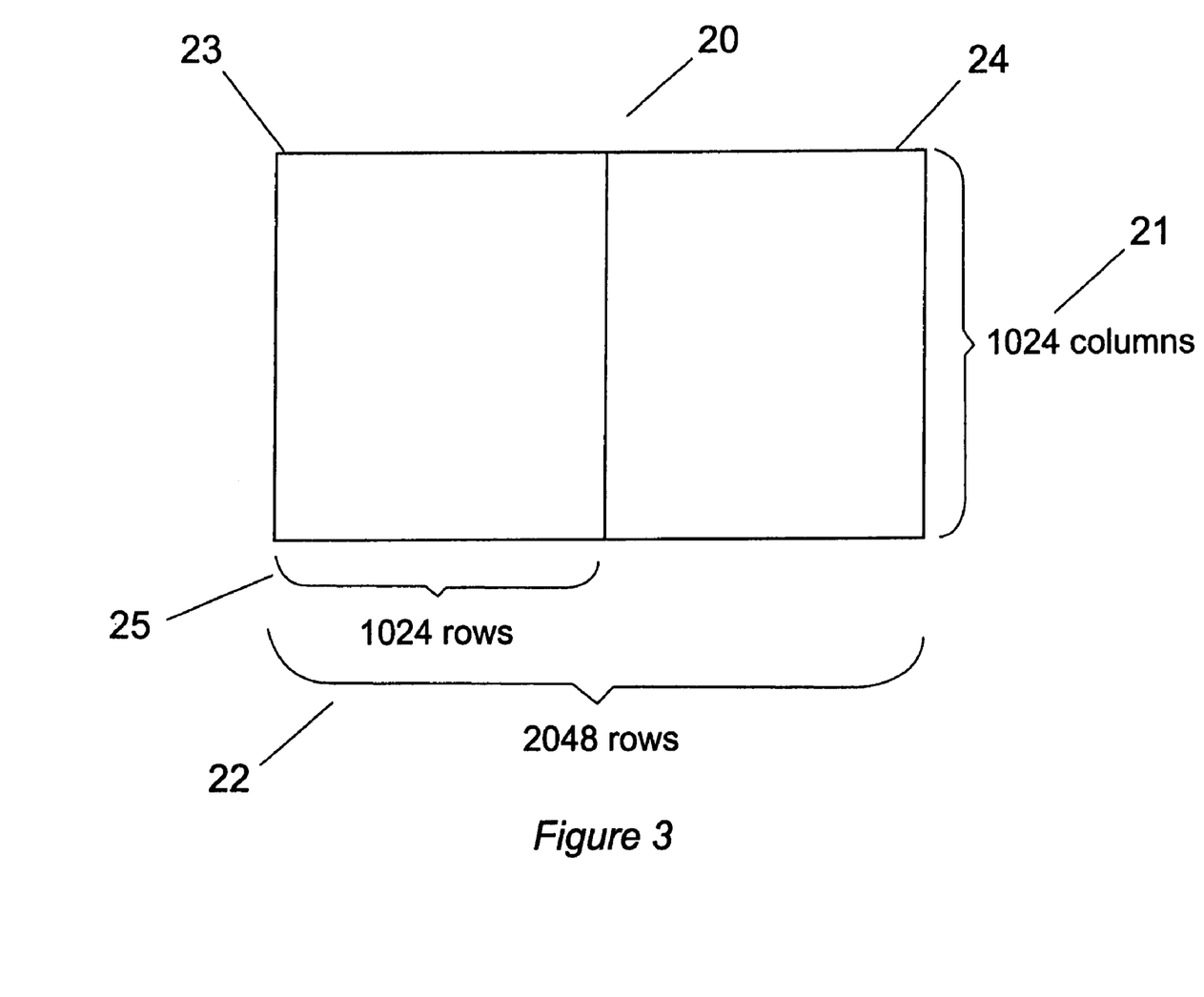
FIG. 3 shows how the dual lens systems of the present invention would share a common image sensor.

In an embodiment of the present invention, the dual objective lenses would share a common image sensor. FIG. 3 shows an example of a 2-megapixel image sensor 20. It has 1024 columns 21 and 2048 rows 22. The traditional free-space objective lens 13 would have an optical path configuration where it would illuminate a first area 23 of the image sensor 20. This represents a 1-megapixel area or 1024 columns 21 by 1024 rows 25. The optical encoding system 14 would have an optical path configuration where it would illuminate a second area 24 of the image sensor. This would still provide a large field of view and good feature resolution, while allowing a single image sensor to be used in a dual imaging mode. Those skilled in the art will realize that this invention is not limited to 2-megapixel image sensors and that other sizes are possible.

In a further embodiment of the present invention, the entire sensor 20 may be illuminated by either the free-space objective lens 13 or the optical encoding system 14. This may be achieved using a mechanism to shift the lenses from side-to-side, i.e. perpendicular to the optical path, so that each lens would have an optical path configuration where it would illuminate both the first and second areas 23 and 24 of the sensor 20. In the example of the 2-megapixel image sensor 20, each lens would have a 2-megapixel area thereby increasing the resolution, yet still sharing the same image sensor. Such mechanisms are known to those skilled in the art and will not be explained in detail here.

Figure 4:
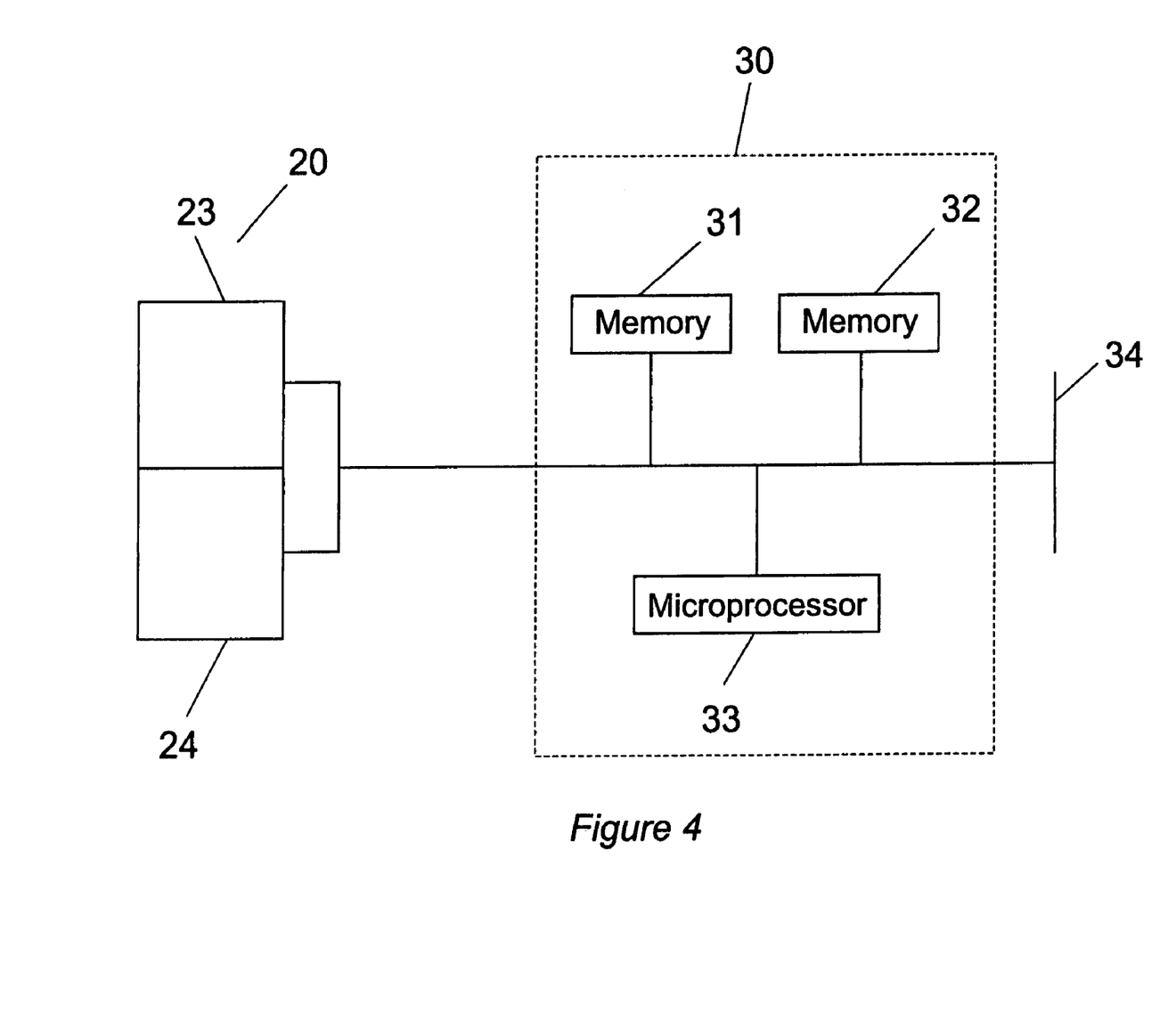
FIG. 4 shows how the dual mode image engine of the present invention communicates with a processor board.

FIG. 4 shows how the dual mode image engine works with the image processing system. Image sensor 20 has a first area 23 dedicated to the traditional free-space objective lens system 13 and a second area 24 dedicated to the optical encoding lens system 14. A processor board 30 comprises a first memory 31, a second memory 32 and microprocessor 33. In the preferred embodiment, first memory 31 is an SDRAM and second memory 32 is a flash-type memory. Other types of memories can be used while still falling within the scope of the present invention. First memory 31 is generally used to store the configuration settings and operation parameters of the imaging system. Second memory 32 is used to temporarily store data from an image capture such as a symbology. Old data is overwritten by newer data much more regularly in second memory 32 than the data stored in first memory 31. Also, fully integrated solutions where the processor and memory types are combined in a single element may also be used. Further elements (not shown here) may also include a power supply and control elements. The processor board 30 provides camera and illumination control, symbology detection, recognition and decode functions for the traditional objective lens 13, and also contains digital filtering for the encoding objective lens 14 for image capture applications. The output of the processor board 30 is then sent to data bus 34 which can be a universal serial bus (USB) or any other suitable data bus known in the art. The data bus 34 transmits the output of the processor board 30 to other devices such as a personal computer (PC).

In another embodiment, the data or images may be stored in resident memory until the appliance containing the processor board and imaging engine is placed in a docking station that provides network access. A third embodiment could include wireless transmission capability integrated with the data bus to provide a mobile device with a transmitter for sending the data or images to a host application.

The optical path and processor board functionality may be controlled for example, through a host interface, configuration bar code, or hard/soft keys on a device keypad. When an optical path is selected, the device only selects the rows and columns of the image sensor array that are illuminated by the lens of the selected path. For example, in a 2-megapixel image sensor array, each lens would illuminate 1-megapixel of the array. This would still provide a large field of view and good feature resolution, while allowing a single image sensor to be used.

Figure 5:
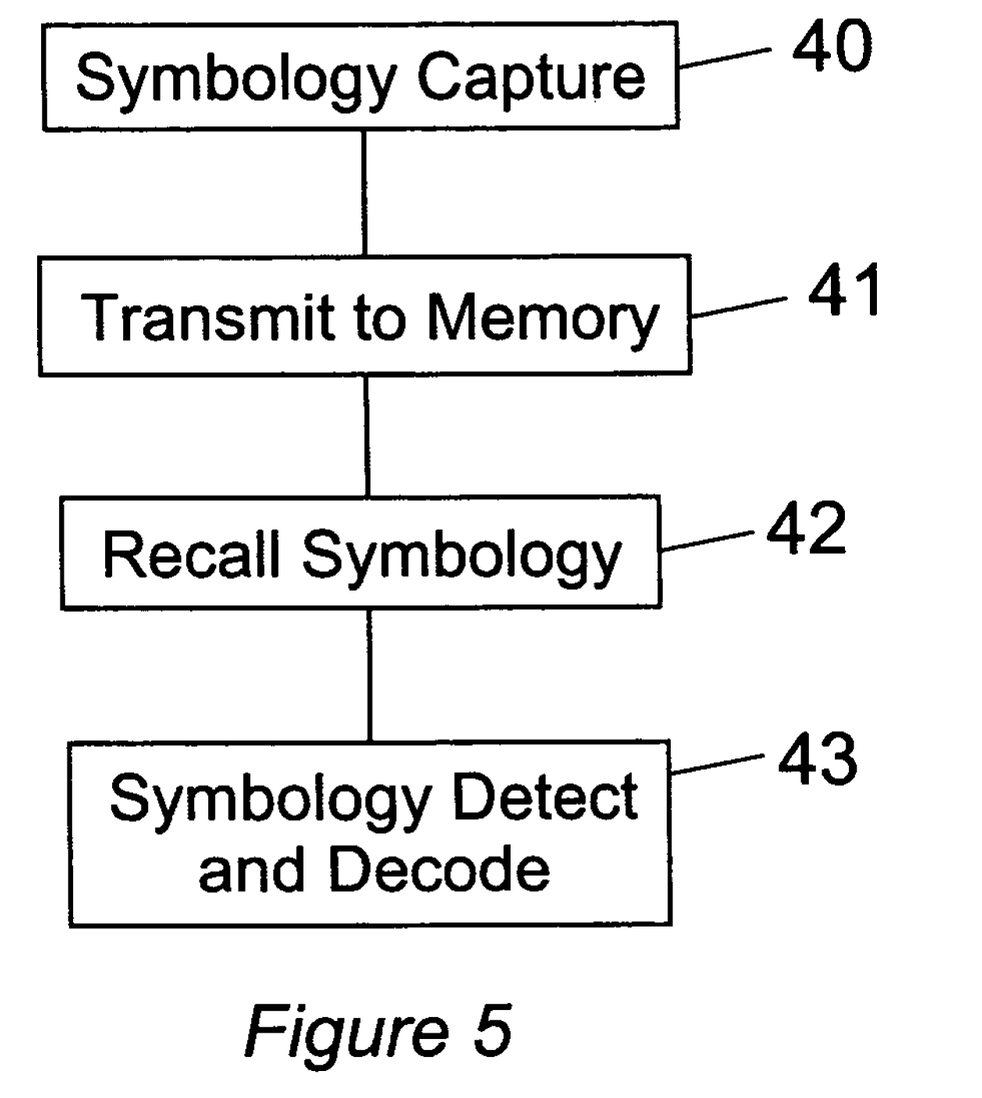
FIG. 5 is a flowchart outlining the basic process steps when the dual mode image engine of the present invention is in a barcode reader mode.

FIG. 5 shows the process steps of the dual mode image engine when the traditional free-space objective lens 13 is active in the symbology capture mode. The first step is to capture 40 an image of the symbology. Once the image has been captured, it is transmitted 41 to memory. The image is then recalled 42 by the microprocessor so that it can detect the symbology, the nature of the symbology and decode 43 the information stored within it. In this mode, the requirements are not so stringent. These requirements include a low exposure time, a higher gain and low illumination. A higher gain is acceptable since the signal-to-noise ratio is not as important in this mode. A lower illumination conserves the battery life since optimal illumination is not critical in this case of 1D or 2D symbologies.

Figure 6:
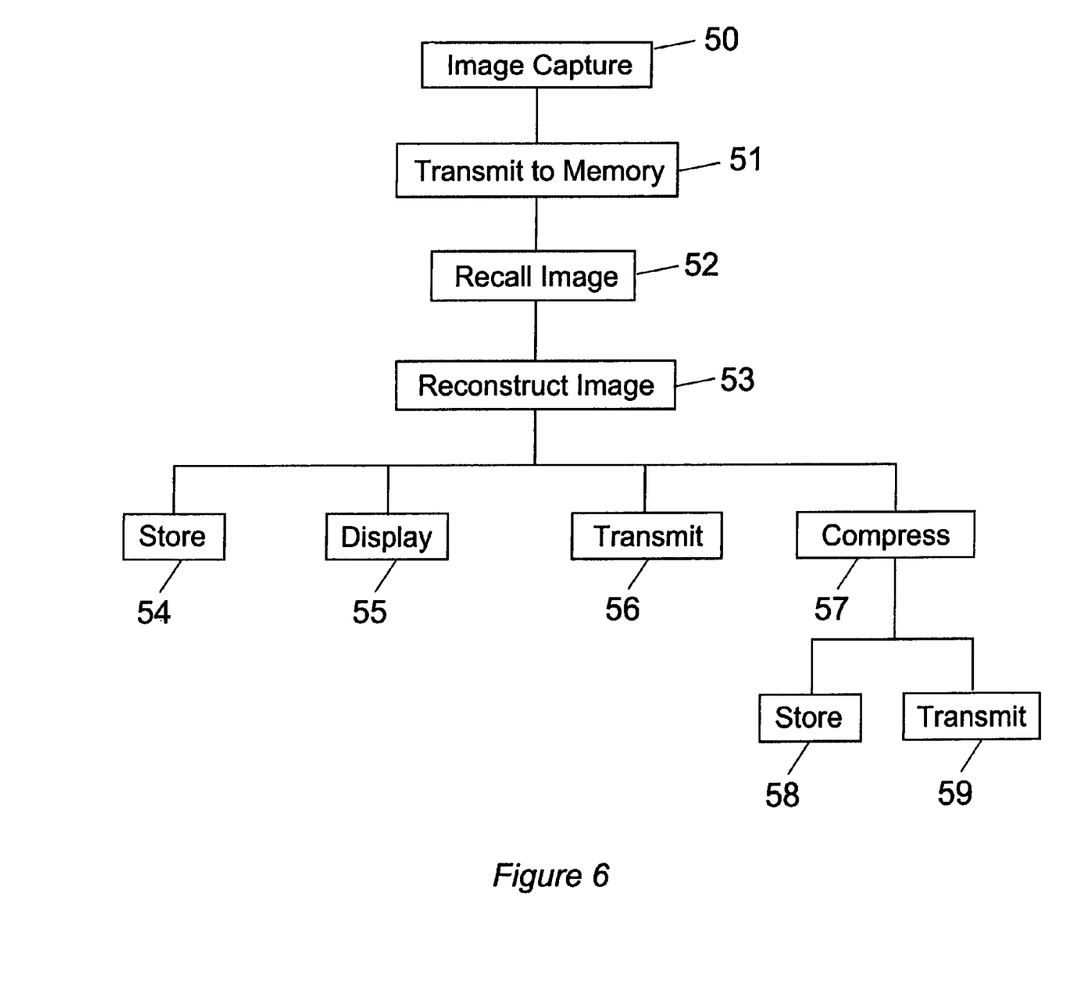
FIG. 6 is a flowchart outlining the basic process steps when the dual mode image engine of the present invention is in an image capture mode.

FIG. 6 shows the process steps of the dual mode image engine when the optical encoding lens system 14 is active in the image capture mode. The first three steps in this process are similar to the first three process steps of FIG. 5. The first step is to capture 50 the image. Once the image has been captured, it is transmitted 51 to memory. The image is then recalled 52 by the microprocessor so that it can perform image reconstruction 53. This step includes a digital filtering operation to filter the blurred image captured by the optical encoded lens system 14. Following this step, the image may be stored 54 in memory, displayed 55 on a monitor or any other suitable display device, transmitted 56 to a number of devices such as a PC, or the image may be compressed 57 according to any number of image compression formats such as JPEG. Once the image is compressed, it can be stored 58 in memory or transmitted 59 to another device. In this mode of operation, the requirements are more stringent. These requirements include a high exposure time, a lower gain and optimal illumination. Only a low gain is acceptable since the signal-to-noise ratio is critical in this mode. Optimal illumination can be required to clearly illuminate all the fine features of the image if so required, however as the lenses used in the encoded application tend to be much faster than lenses used for symbology detection, illumination is not always necessary.

The housing of the dual mode image engine of the present invention further includes a display such as a monitor and a keypad. The selection between either the free-space optical lens 13 or the optical encoding lens system 14 can be soft key such as a touch screen display or hard key such as selection on the keypad. If both lens systems 13, 14 have optical path configuration that illuminate half of an image sensor 20, than the image sensor half 23, 24 associated with the de-selected lens system 13, 14 is de-activated. If a mechanism is used to switch between lens systems 13, 14, then the mechanism is controlled by the display or keypad input.

A further embodiment for selecting between either the free-space optical lens 13 or the optical encoding lens system 14 uses configuration barcodes. A configuration barcode contains system configuration information including data, which selects or de-selects either optical system 13, 14. When the image reader reads and decodes the data contained in the configuration barcode, the image reader has the entire configuration data required to setup for a particular application. No external operator input is required. Configuration barcodes are well known in the art, so no further details on this technique are necessary.

An advantage of the present invention is improved depth of field in comparison with prior art devices. Some other advantages of the present invention include optimized image processing time and reduced cost, since a single image reader accommodates different imaging applications.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. An image reader for imaging a target comprising:
    a single image sensor including:
    a single pixel array having a first pixel area and a second pixel area;
        a plurality of lens systems sharing the single image sensor, the plurality of lens systems including:
    a free-space objective lens system for directing light reflected from the target onto the first pixel area of the image sensor; and
    an optically encoded lens system for encoding light reflected from the target and directing the encoded light onto the second pixel area of the image sensor, the encoded light having an alternate optical path deviated from a regular optical path so that a point is blurred over a predetermined range and not focused on a focal plane, resulting in an increase of a depth of field; and an image engine providing a plurality of modes, the plurality of modes including:

a symbology capture mode to capture the target on the first pixel area using the free-space objective lens system; and an image capture mode to capture the target on the second pixel area using the optically encoded lens system;

the image engine including:

a processor for processing the signals from the first pixel area captured during the symbology capture mode and for decoding the signals from the second pixel area captured during the image capture mode using a digital filter function; and an input for selectively activating the symbology capture mode or the image capture mode.

2. The image reader of claim 1 comprising a memory for storing signals from the image sensor for processing by the processor.

3. The image reader of claim 1 comprising a memory for selectively storing signals from the first area and the second area of the image sensor for processing by the processor.

4. The image reader of claim 1 comprising an image reader housing for mounting the imager sensor, the free-space objective lens system and the optically encoded lens system, the free-space objective lens system and, the optically encoded lens system being mounted in parallel within the image reader housing.

5. The image reader of claim 1 wherein the processor comprises means for transmitting the processed signals to a host application through a data bus.

6. The image reader of claim 1 wherein the processor comprises means for transmitting the processed signals to a host application through wireless communications.

7. The image reader of claim 1 wherein the processor comprises means for transmitting the processed signals to a display for displaying the target image.

8. The image reader of claim 1 wherein the free-space objective lens system comprises a single free-space lens.

9. The image reader of claim 1 wherein the free-space objective lens system comprises multiple single free-space lenses.

10. The image reader of claim 1 wherein the free-space objective lens system comprises a spherical lens.

11. The image reader of claim 1 wherein the free-space objective lens system comprises an aspherical lens.

12. The image reader of claim 1 wherein the free-space objective lens system comprises a multi-focus lens.

13. The image reader of claim 1 wherein the image sensor is a CMOS device.

14. The image reader of claim 1 wherein the image sensor is a CCD device.

15. An image reader for imaging a target comprising:

a single image sensor:

a single pixel array having a first pixel area and a second pixel area;

a plurality of lens systems sharing the single image sensor, the plurality of lens systems including:

a free-space objective lens system for directing light reflected from the target onto the image sensor, and an optically encoded lens system for encoding light reflected from the target and directing the encoded light onto the second pixel area of the image sensor, the encoded light having an alternate optical path deviated from a regular optical path so that a point is blurred over a predetermined range and not focused on a focal plane, resulting in an increase of a depth of field;

a mechanism for shifting the lenses of the free-space objective lens system and the optically encoded lens system from side to side so that at least one of the first pixel area and the second pixel area is illuminated by one of the free-space objective lens system and the optically encoded lens system; and an image engine providing a plurality of modes, the plurality of modes including:

a symbology capture mode to capture the target on the first pixel area using the free-space objective lens system; and an image capture mode to capture the target on the second pixel area using the optically encoded lens system;

the image engine including:

a processor for processing the signals from the first pixel area captured during the symbology capture mode and for decoding the signals from the second pixel area captured during the image capture mode using a digital filter function; and an input for selectively activating the symbology capture mode or the image capture mode.

16. The image reader of claim 15 comprising a memory for storing signals from the image sensor for processing by the processor.

17. The image reader of claim 15 comprising an image reader housing for mounting the imager sensor, the free-space objective lens system, the optically encoded lens system and a control mechanism for controlling the free-space objective lens system and the optically encoded lens system for selectively directing light to the image sensor from one or other of the lens systems.

18. The image reader of claim 15 wherein the processor comprises means for transmitting the processed signals to a host application through a data bus.

19. The image reader of claim 15 wherein the processor comprises means for transmitting the processed signals to a host application through wireless communications.

20. The image reader of claim 15 wherein the processor comprises means for transmitting the processed signals to a display for displaying the target image.

21. The image reader of claim 15 wherein the free-space objective lens system comprises a single free-space lens.

22. The image reader of claim 15 wherein the free-space objective lens system comprises multiple single free-space lenses.

23. The image reader of claim 15 wherein the free-space objective lens system comprises a spherical lens.

24. The image reader of claim 15 wherein the free-space objective lens system comprises an aspherical lens.

25. The image reader of claim 15 wherein the free-space objective lens system comprises a multi-focus lens.

26. The image reader of claim 15 wherein the image sensor is a CMOS device.

27. The image reader of claim 15 wherein the image sensor is a CCD device.

* * * * *

UNITED STATES PATENT AND TRADEMARK OFFICE
CERTIFICATE OF CORRECTION

PATENT NO. : 7,830,443 B2
APPLICATION NO. : 11/018890
DATED : November 9, 2010
INVENTOR(S) : Page It is certified that error appears in the above-identified patent and that said Letters Patent is hereby corrected as shown below:

In Column 1, Line 41, delete "Complimentary" and insert -- Complementary --, therefor.

In Column 2, Line 23, delete "al" and insert -- al. --, therefor at each occurrence throughout the specification.

In Column 2, Line 36, delete "driver" and insert -- drive --, therefor.

In Column 6, Line 22, delete "comprises," and insert -- comprises --, therefor.

In Column 9, Line 26, in Claim 4, delete "and," and insert -- and --, therefor.

In Column 9, Line 55, in Claim 15, delete "sensor:" and insert -- sensor including: --, therefor.

In Column 9, Line 61, in Claim 15, delete "sensor, and" and insert -- sensor; and --, therefor.

Signed and Sealed this
Ninth Day of April, 2013

Teresa Stanek Rea
*Acting Director of the United States Patent and Trademark Office*